UNITED STATES PATENT OFFICE.

ROBERT B. LEBO, OF ELIZABETH, NEW JERSEY, ASSIGNOR TO STANDARD OIL COMPANY, OF BAYONNE, NEW JERSEY, A CORPORATION OF NEW JERSEY.

PROCESS OF PURIFYING HIGHER SECONDARY ALCOHOLS.

1,422,583.     Specification of Letters Patent.     Patented July 11, 1922.

No Drawing.     Application filed February 16, 1921. Serial No. 445,477.

*To all whom it may concern:*

Be it known that I, ROBERT B. LEBO, a citizen of the United States, residing at Elizabeth, in the county of Union and State of New Jersey, have invented a new and useful Improvement in Processes of Purifying Higher Secondary Alcohols, of which the following is a specification.

The present invention relates to purifying secondary butyl alcohol and other secondary alcohols higher than isopropyl alcohol, and more particularly their purification when associated with isopropyl alcohol or with water or both.

Secondary butyl alcohol, secondary amyl alcohols and other secondary alcohols higher than isopropyl alcohol, when obtained from a source or by means of a process, such that a series of alcohols are formed, are ordinarily associated with isopropyl alcohol, and very frequently with water. This is particularly the case when the alcohol is produced from petroleum distillation gases, compressed or condensed oil gas, or the like. The separation of the higher secondary alcohol and particularly the secondary butyl alcohol from isopropyl alcohol by fractional distillation is difficult, notwithstanding the considerable gap between their boiling points, that of isopropyl alcohol being 82.4° C. and that of secondary butyl alcohol 99.8° C. This difficulty of separation is increased by the presence of water, which appears to form with the two alcohols named a ternary mixture boiling at 85° to 87° C. The character of this mixture has not yet been fully investigated, but from its conduct I am inclined to believe that it may be a mixture of constant composition having this boiling point.

In accordance with the present invention, the separation of the secondary butyl alcohol and other higher secondary alcohols from the isopropyl alcohol, either in the presence or absence of water, is effected by taking advantage of the fact that benzol forms a low boiling point binary mixture with isopropyl alcohol and a low boiling point ternary mixture with isopropyl alcohol and water and of the further fact, which I have discovered, that benzol does not form binary mixtures with secondary butyl alcohol nor the higher secondary alcohols, nor ternary mixtures with secondary butyl alcohol and water, nor with higher secondary alcohols and water.

Benzol, which boils at 80° C., forms a binary mixture with isopropyl alcohol containing 33⅓ per cent benzol and 66⅔ per cent isopropyl alcohol, this mixture having a boiling point of 71.9° C. It forms a ternary mixture with water and isopropyl alcohol, having a composition of 73.8 per cent benzol, 7½ per cent of water, and 18.7 per cent of isopropyl alcohol, this mixture having a boiling point of 66.5° C.

In carrying out the present invention, when water is absent, sufficient benzol is added to the mixture of secondary butyl and isopropyl alcohols, or isopropyl alcohol with other higher secondary alcohols, such as secondary amyl alcohols, to form a binary mixture with the isopropyl alcohol. On distillation, this binary mixture may readily be separated from the secondary butyl alcohol by a suitable fractionating device. If water is present in addition, benzol is added to the mixture, together with such proportions of water or isopropyl alcohol as are necessary to produce the ternary mixture above described. This ternary mixture is then separated from the isopropyl alcohol by fractional distillation. The presence of excess benzol has no disadvantageous effects, as it may readily be separated from secondary butyl alcohol by fractionation.

To illustrate the present process, it may be assumed that secondary butyl alcohol containing ten per cent of isopropyl alcohol in admixture is to be purified. Sufficient benzol is added to make with the isopropyl alcohol the binary mixture above described. At least five per cent of benzol is therefore added. It is preferred that the amount of benzol added be somewhat in excess of this, for example, eight to ten per cent, as the presence of the excess benzol has no disadvantageous effects. After addition of the benzol, the mixture is placed in a suitable still provided with a column for effective fractionation, and the mixture is distilled. All of the isopropyl alcohol will come over with the benzol at a temperature of about 71.9° C. The temperature of the vapors then rises as the excess benzol distils off, and, when the vapor temperature approaches 99.8, a cut in the distillate is made, and the remainder of the distillate coming over at about 99.8° C. is relatively pure secondary butyl alcohol, as substantially all of the excess benzol will distil over at about 80° C.

In case of a mixture containing water as well as isopropyl alcohol, benzol is added in excess of the quantity provided to produce the ternary mixture above described with the isopropyl alcohol and water present and also the binary mixture with any isopropyl alcohol in excess of that required for the production of the ternary mixture. In case there is not sufficient isopropyl alcohol in the mixture to form the ternary mixture with the water and benzol, isopropyl alcohol must be added to make up this proportion. After the benzol and the isopropyl alcohol, if required, are added to the mixture, it is fractionally distilled. The ternary mixture described will begin to distil at 66.5° C. This mixture may then be removed and the relatively pure secondary butyl alcohol separated by fractionation from any binary mixture or excess benzol which may be present.

The benzol may be separated from the mixture of benzol and isopropyl alcohol with or without water forming the distillate coming over before the secondary butyl alcohol in the process hereinbefore described by adding water to the mixture until the benzol separates out as an immiscible layer. The separated benzol may be reduced and the dilute alcohol solution concentrated, if desired.

The present invention has been set forth in connection with the specific proportion of the several binary and ternary mixtures involved. It is not intended, however, that the scope of the invention shall be limited by these specific proportions, as they are intended to be only approximate and sufficiently accurate to enable the process to be practiced. Furthermore, variations in the pressure of operation will necessarily cause variations in the proportions of these mixtures. In so far as the present invention is concerned, the pressure of operation is immaterial so long as low-boiling mixtures of the ingredients are formed.

I claim:

1. The process of purifying secondary alcohols higher than isopropyl alcohol when in a mixture including isopropyl alcohol which comprises adding benzol at least sufficient to form a low-boiling-point mixture with the isopropyl alcohol and subjecting the mixture to fractional distillation.

2. The process of purifying secondary alcohols higher than isopropyl alcohol when in a mixture including isopropyl alcohol which comprises adding an excess of benzol over the amount required to form a low-boiling-point mixture with the isopropyl alcohol and subjecting the mixture to fractional distillation.

3. The process of purifying secondary alcohols higher than isopropyl alcohol when in admixture with isopropyl alcohol and water which comprises adding benzol thereto, the amount of benzol added being at least sufficient to form low-boiling-point mixtures including all the water and isopropyl alcohol, and fractionally distilling the mixture.

4. The process of purifying secondary alcohols higher than isopropyl alcohol when in admixture with water which comprises supplying benzol and isopropyl alcohol in the admixture, the amounts thereof being such that all of the water and isopropyl alcohol will be included in low-boiling-point mixtures with the benzol, and subsequently fractionally distilling the mixture.

5. The process of purifying secondary butyl alcohol when in admixture with water which comprises adding benzol and isopropyl alcohol thereto in such amounts that the isopropyl alcohol present is at least sufficient to form a constant boiling-mixture with the benzol and water including all the water present and the benzol present is at least sufficient to form constant boiling point mixtures with all the isopropyl alcohol and water present, and subsequently fractionally distilling the mixture.

6. The process of separating the ingredients of a mixture containing secondary butyl alcohol, isopropyl alcohol and benzol which comprises subjecting the mixture to fractional distillation, separating the distillate into two cuts, one including the secondary butyl alcohol and the other including the isopropyl alcohol and benzol, and adding water to the latter cut, thereby causing separation of the benzol.

ROBERT B. LEBO.